Aug. 16, 1966     R. M. DIETZ     3,266,475
DRESSING TOOL FOR FEMALE GRINDING WHEEL
Filed July 10, 1963     3 Sheets-Sheet 1
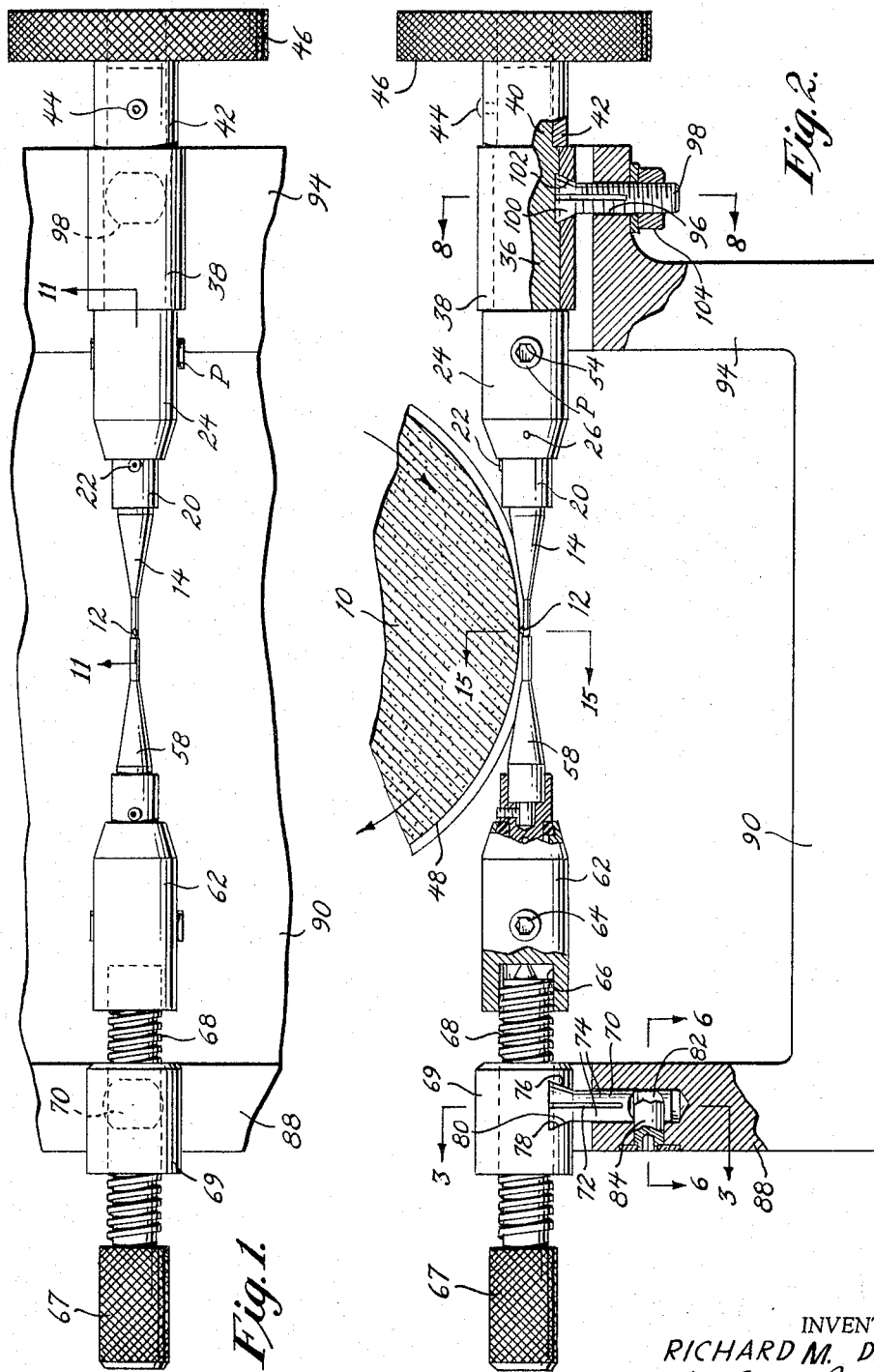
INVENTOR.
RICHARD M. DIETZ
BY
ATTORNEY.

Aug. 16, 1966   R. M. DIETZ   3,266,475
DRESSING TOOL FOR FEMALE GRINDING WHEEL
Filed July 10, 1963   3 Sheets-Sheet 2

INVENTOR.
RICHARD M. DIETZ
BY Louis Necho
ATTORNEY.

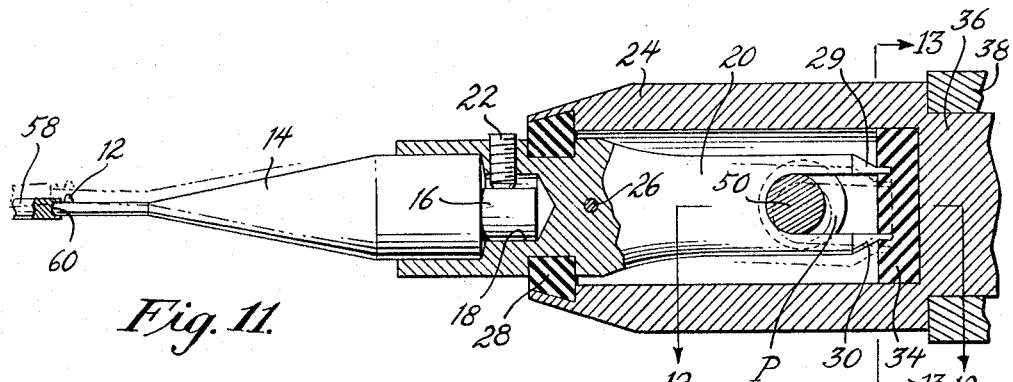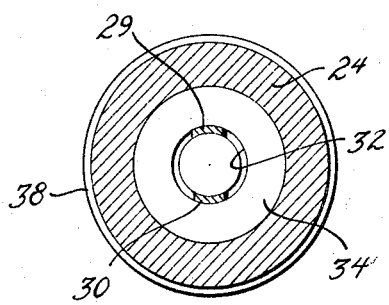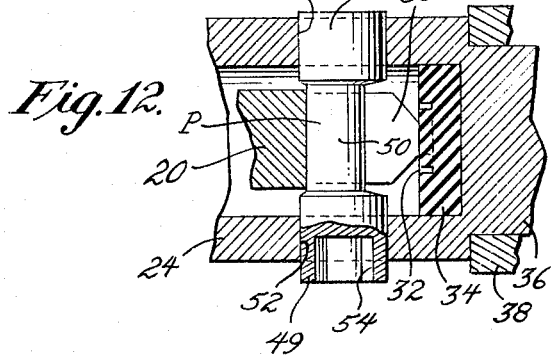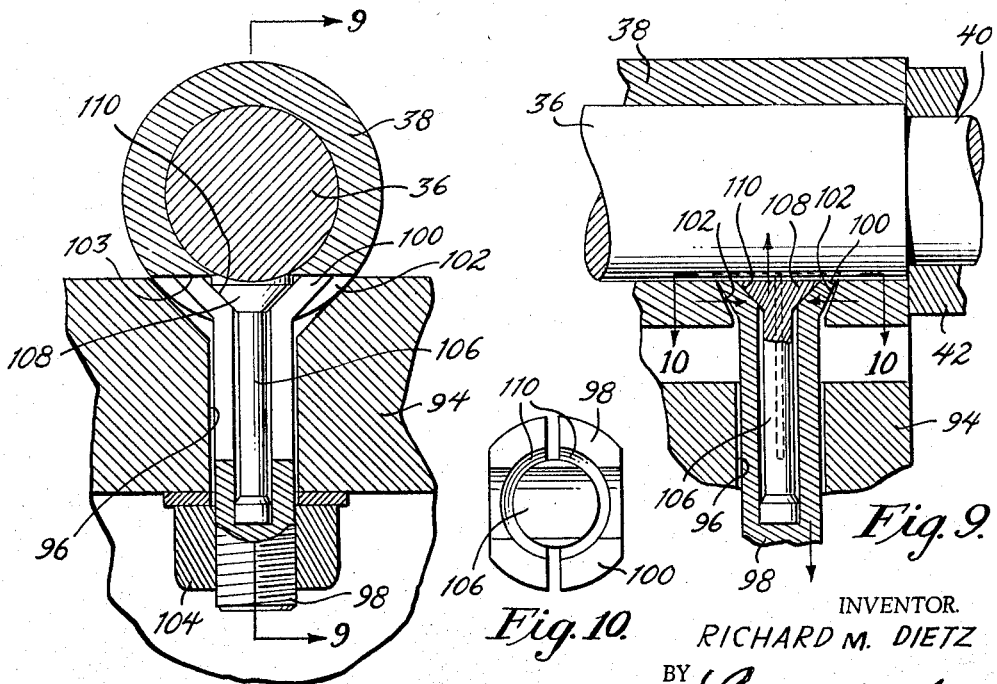

United States Patent Office 3,266,475
Patented August 16, 1966

3,266,475
DRESSING TOOL FOR FEMALE GRINDING WHEEL
Richard M. Dietz, 200 Springfield Ave., Springfield, Pa.
Filed July 10, 1963, Ser. No. 294,034
6 Claims. (Cl. 125—11)

A grinding wheel can have a planar cutting surface for producing a flat surface in a work piece; or it can have a convex, or male, cutting surface for producing a concave, or female, contour in the work piece, or it can have a concave, or female, cutting surface for producing a convex, or male, contour in the work piece. In any case, the cutting surface of the grinding wheel must be initially dressed to the desired contour and, in many, if not most, cases, the wheel has to be dressed more than once to finish a long grinding operation on a single work piece, or it may have to be dressed a number of times to complete a "run" of identical work pieces. Accurately setting up the dressing tool is time consuming and calls for the highest type of skill and to have to set the tool up for each dressing of the grinding wheel is quite expensive.

In my Patent No. 3,085,370, I have showed means for accurately dressing and re-dressing the flat, or convex, cutting surface of a grinding wheel with one setting of the dressing tool.

The object of the present invention is to produce means for dressing and re-dressing the concave, or female, contour of a grinding wheel accurately with a single set-up of the dressing tool.

A still further object is to produce a tool for dressing a female grinding surface to different radii with a cutting tool of a fixed length and without moving the tool itself relative to the mechanism which carries the tool.

A still further object is to produce a grinding wheel dressing mechanism which, once set up by a qualified mechanic, can be repeatedly used without any further adjustment and without any special skill.

These and other objects are attained by my invention as set forth in the following specification and illustrated in the accompanying drawings in which:

FIG. 1 is a top plan view of a grinding wheel dressing machine embodying the invention.

FIG. 2 is a view, partly in side elevation and partly in section, showing the application of a dressing tool embodying the invention to a female grinding wheel.

FIG. 8 is an enlarged sectional view looking in the direction of line 8—8 on FIG. 2.

FIG. 9 is a sectional view looking in the direction of line 3—3 on FIG. 8.

FIG. 10 is a sectional view looking in the direction of line 10—10 on FIG. 9.

FIG. 11 is an enlarged sectional view looking in the direction of line 11—11 on FIG. 1.

FIG. 12 is a sectional view looking in the direction of line 12—12 on FIG. 11.

FIG. 13 is a sectional view looking in the direction of line 13—13 on FIG. 11.

Figure 3:
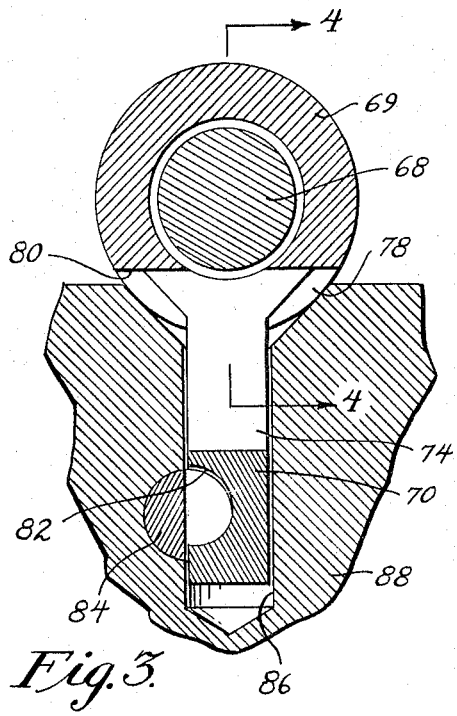
FIG. 3 is an enlarged sectional view looking in the direction of line 3—3 on FIG. 2, showing the parts in one position.
Figure 4:
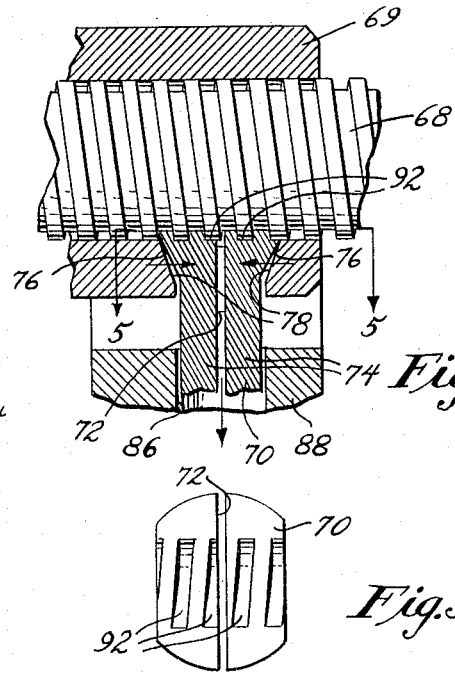
FIG. 4 is a sectional view looking in the direction of line 4—4 on FIG. 3.
Figure 5:
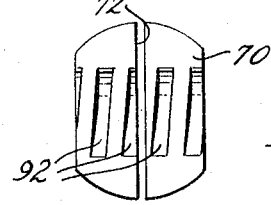
FIG. 5 is a sectional view looking in the direction of line 5—5 on FIG. 4.
Figure 7:
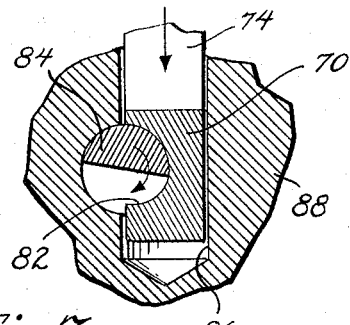
FIG. 7 is similar to the lower portion of FIG. 3, but showing the parts in a different position.
Figure 6:
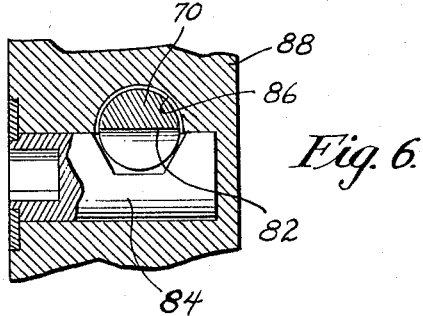
FIG. 6 is an enlarged sectional view looking in the direction of line 6—6 on FIG. 2.

A grinding wheel 10 is conventionally dressed by means of a hard cutting element, such as a diamond 12 which, according to my invention, is mounted near the small end of a tapered shank 14, the large end of which is provided with a reduced, cylindrical portion 16 which is received in bore 18 formed in one end of a spindle 20. Reduced end 16 of shank 14 is provided with a flat surface which is engageable with a set screw 22 whereby shank 14 and spindle 20 are connected for joint rotation. FIG. 11.

Spindle 20 extends within an actuating sleeve 24 to which it is secured by pivot pin 26. The left end of spindle 20 and the left end of sleeve 24 are recessed to receive a collar 28 which is made of rubber or other vibration damping material. The other, or right hand, end of spindle 20 is cut out to form two prongs 29 and 30 which are adapted to engage arcuate groove 32 in a washer 34 made of rubber or other vibration dampening material. FIGS. 12 and 13.

Sleeve 24 is provided with a solid reduced portion 36 which passes through a bearing sleeve 38. FIG. 2. Beyond sleeve 38, the reduced portion 36 is further reduced to form a stem 40 which enters a sleeve 42 to which it is secured by a set screw 44. Sleeve 42 is secured to, or is integral with, an operating knob 46 whereby rotation of knob 46 rotates sleeve 24, spindle 20 and shank 14. When the axis of shank 14 is concentric with knob 46, the radius of the female contour 48 formed in wheel 10 will be a function of the length of diamond 12, or the distance between the effective cutting surface of the diamond and the axis of rotation of shank 14. To make female contours of larger or of smaller radii by conventional tools of which I am aware, it is necessary to use diamonds of different lengths. It may be noted that the diamonds used for this purpose are permanently mounted and, hence, are not adjustable. In order to be able to produce female contours of different radii without changing the diamond, I provide means for changing the relation of the axis of rotation of shank 14 and spindle 20 relative to the axis of rotation of acuating sleeve 24 and of knob 46.

Figure 15:
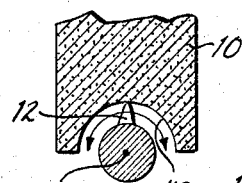
FIG. 15 is a greatly enlarged sectional view looking in the direction of line 15—15 on FIG. 2, showing one position of the diamond.
Figure 16:
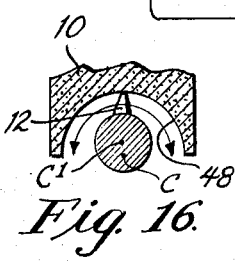
FIG. 16 is similar to FIG. 15, but showing a second position of the diamond.

In the preferred embodiment, I provide an adjusting pin P formed of concentric end portions 49 and an intermediate excentric portion 50. End portions 49 fit snugly in registering bores 52 formed in actuating sleeve 24 and are provided with polygonal sockets 54 for engagement with a wrench. Excentric portion 50 of pin P fits tightly between prongs 29 and 30 of spindle 20 whereby once pin P has been rotated to a given position, it will remain in said position until forcefully moved. Rotation of pin P causes excentric portion 50 to bear against prong 29 or 30 and displaces the axis of spindle 20 and of shank 14 relative to the axis of actuating sleeve 24 and knob 46, as shown in broken lines in FIG. 11. The effect of this displacement is shown in FIGS. 15 and 16. For example, when shank 14, spindle 20 and knob 46 are concentric, their axes will be at C in FIG. 15 and the diamond will cut a female contour of minimal radius. When pin P is turned to displace the axes of spindle 20 and shank 14, the axis of knob 46 will remain at C, but the axis of rotation of the diamond will be at C–1 and the diamond will cut a contour of a correspondingly larger diameter. Thus, by displacing the axis of rotation of the diamond, female contours of larger radii can be cut with a fixed size diamond.

Figure 14:
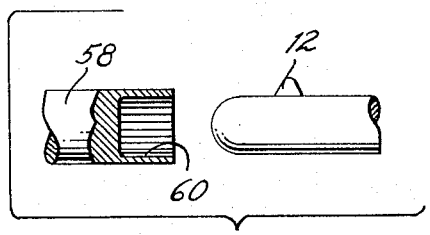
FIG. 14 is a greatly enlarged exploded view of the left end portion of FIG. 11.

When shank 14 and the other parts mentioned are sufficiently rigid, no extraneous support is needed for the free end of shank 14. But, when shank 14 is very thin, as it is in small and delicate work, it does need a support. To this end, I provide a shank 58 which has a hollow end 60 for receiving and supporting the extreme end of shank 14 as shown in FIGS. 11 and 14.

Except for having hollow end 60, shank 58 is preferably identical with shank 14 and is connected to a sleeve 62 which is internally identical with sleeve 24 and includes an excentric pin like pin P which is provided with a polygonal socket 64 which is like socket 54, etc. Instead of being provided with an operating knob like knob 46, sleeve 62 is provided with a bore 66 for receiving the end of an adjusting screw 68 which passing through sleeve bearing 69 and which will be hereinafter further referred to.

The operation of the parts thus far described is as follows:

If the parts are sufficiently rigid, shank 58 and its associated parts are omitted and it is merely necessary to adjust pin P to obtain a female contour of the desired radius.

If shank 14 is thin, shank 58 and its adjuncts are used. In this case, shank 58 is backed off to disengage its hollow end 60 from the end of shank 14; pin P is turned to bring shank 14 to the desired position, and, by inserting a wrench in socket 64 of the adjusting pin in sleeve 62, shank 58 will be moved to a position in which it is coaxial with shank 14. This can be done by feel and observation, or by "joe blocks" and straight edges, or other tools. When shanks 14 and 58 are in co-axial position, screw 68 is advanced to engage the end 60 of shank 14 with the hollow end of a shank 58. After the grinding wheel is dressed, it is lifted out of contact with the diamond and the dressing tool is moved out of the way. When it is necessary to re-dress the wheel, it is merely necessary to move the tool to its previously indexed position and to lower the wheel into contact with the diamond which is oscillated manually, or by automatic means.

Screw 68 is preferably locked against unintended movement by means of a bolt 70 which is split, as at 72, to produce flexible arms 74. The head of bolt 70 is beveled, as at 76, for engagement with the correspondingly beveled sides 78 of an opening 80 formed in the bottom of sleeve 69. FIGS. 2 and 3. Bolt 70 is provided with a transverse excentric opening 82 which is adapted to be engaged by an actuating pin 84, FIG. 3, whereby rotation of the pin 84 will raise or lower bolt 70 in a bore 86 formed in one arm 88 of a C-shaped bracket 90. When bolt 70 is lowered, beveled sides 76 thereof are pushed together by beveled sides 78 to clamp the female threads 92 in the head of the bolt against the threads of screw 68 to immobilize the screw, and vice versa. It will be understood that the total vertical movement of bolt 70 is less than the depth of the threads on screw 68 so that female threads 92 on the head of bolt 70 will engage the male threads of screw 68 at all times—loosely when bolt 70 moves to its upper position and tightly when bolt 70 moves to its lower position.

The opposite arm 94 of C-bracket 90 is provided with a bore 96 through which is freely movable an externally threaded, split pin 98, the upper end, or head 100 of which is tapered and engages the sides 102 of a similarly tapered opening 103 in the underside of bearing sleeve 38. The lower end of pin 98 is engaged by a nut 104 whereby, when the nut is turned in a direction to lower the pin, tapered sides of the head 100 of the pin will be squeezed together by the tapered sides 102 of opening 103, and whereby, when the nut is turned in the opposite direction, the parts of the pin spring apart to their normal, parallel position and move the pin slightly upwardly. Received in a bore formed in split pin 98 is a floating pin 106 which is provided with a tapered head 108, the beveled sides of which are adapted to engage cam surfaces 110 of head 100 of pin 98. FIG. 8. By this arrangement, when pin 98 is pulled down by nut 104, floating pin 106 is "squeezed" up, and vice versa. Upward movement of floating pin 106 causes its head 108 to press against extension 36 of actuating sleeve 24 to apply a measured drag which provides the desired feel.

I claim:
1. A dressing tool for a female grinding wheel, said tool including
   a shank,
   a fixed cutting element of a predetermined size carried by one end of said shank and extending perpendicular to said shank for engagement with the periphery of said wheel,
   a spindle coaxial with said shank,
   means securing the other end of said shank to one end of said spindle,
   a sleeve coaxial with said shank and enclosing the other end of said spindle, cushioning means intermediate spaced portions of said sleeve and the corresponding portions of said spindle,
   means pivotally connecting said other end of said spindle to said sleeve for movement about an axis perpendicular to the extent of said cutting element and the axis of said spindle whereby said spindle is movable from said coaxial position to a second position in which the axis of said spindle is at an angle relative to the axis of said sleeve,
   adjusting means for controllably moving said spindle into, and maintaining it in either of said positions and
   means for rotating said sleeve to rotate said spindle and said cutting element relative to the periphery of said wheel.

2. The structure recited in claim 1 in which said sleeve has a through opening therein registering with an inner end of said spindle
   in which said inner portion of said spindle is provided with a hole in alignment with said opening, and
   in which said adjusting means includes an excentric pin passing through said opening and engaging said hole whereby rotation of said pin about an axis vertical to the axis of rotation of said sleeve moves said spindle and said shank to said second position.

3. The structure recited in claim 1 and
   a separate support for the free end of said shank, and means for aligning said support with the axis of said shank.

4. The structure recited in claim 3 in which said support includes
   a second shank having a recess formed in one end thereof for receiving the free end of said shank, and
   readjusting means for moving said support axially and for aligning said second shank with said first mentioned shank, and means for locking said support in adjusted position.

5. The structure recited in claim 3 wherein said support comprises:
   a second shank having a first recess in one end thereof for receiving the free end of the first mentioned shank and
   a second recess in the other end thereof,
   a screw engaging said second recess
   a fixed bearing threadedly engaging said screw whereby rotation of said screw moves said second shank axially towards and away from the free end of first mentioned shank,
   locking means passing through said bearing for engagement with said screw and
   an excentric engaging said locking means and movable in one direction to engage said locking means with said screw and in another direction to disengage said locking means from said screw.

6. The structure recited in claim 4 in which said second shank has a notch therein, and a second excentric pin engaging said last mentioned notch and rotatable to align said second shank with said first shank.

References Cited by the Examiner
UNITED STATES PATENTS

| | | | |
|---|---|---|---|
| 2,309,924 | 2/1943 | Root | 125—11.7 |
| 2,532,790 | 12/1950 | Schmitt | 74—54 |
| 2,712,817 | 7/1955 | Trefz | 125—11.7 |
| 2,744,515 | 5/1956 | Bruderick | 125—11.4 |
| 2,794,433 | 6/1957 | Shanley | 125—11.4 |
| 2,986,048 | 5/1961 | Neilsen | 125—11.10 |
| 3,220,399 | 11/1965 | Seidel | 125—11 |

FOREIGN PATENTS 604,799   10/1934   Germany.

HAROLD D. WHITEHEAD, *Primary Examiner.*